United States Patent
Kobayashi et al.

(10) Patent No.: US 9,033,123 B2
(45) Date of Patent: May 19, 2015

(54) VALVE STRUCTURE

(75) Inventors: Yukimasa Kobayashi, Kani (JP); Hideaki Takeuchi, Kani (JP); Yoshihiro Shibata, Tajimi (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/116,261

(22) PCT Filed: May 22, 2012

(86) PCT No.: PCT/JP2012/063070
§ 371 (c)(1),
(2), (4) Date: Nov. 7, 2013

(87) PCT Pub. No.: WO2012/169343
PCT Pub. Date: Dec. 13, 2012

(65) Prior Publication Data
US 2014/0076677 A1    Mar. 20, 2014

(30) Foreign Application Priority Data
Jun. 8, 2011    (JP) .................................. 2011-127924

(51) Int. Cl.
*F16F 9/34*    (2006.01)
*F16F 9/348*    (2006.01)

(52) U.S. Cl.
CPC ............. *F16F 9/3405* (2013.01); *F16F 9/3481* (2013.01)

(58) Field of Classification Search
CPC ........... F16F 9/348; F16F 9/5126; F16F 9/34; F16F 9/512; F16F 9/3405; F16F 9/3481

USPC ........... 188/322.15, 282.1, 282.5, 282.6, 283, 188/283.1, 316, 317
See application file for complete search history.

(56) References Cited

U.S. PATENT DOCUMENTS

| | | | | |
|---|---|---|---|---|
| 4,615,420 | A | * | 10/1986 | Mourray ................... 188/322.15 |
| 5,072,812 | A | | 12/1991 | Imaizumi |
| 5,085,300 | A | * | 2/1992 | Kato et al. .................. 188/282.6 |
| 5,413,195 | A | * | 5/1995 | Murakami ................. 188/282.6 |
| 5,529,154 | A | * | 6/1996 | Tanaka ...................... 188/282.6 |
| 5,595,269 | A | * | 1/1997 | Beck ........................... 188/282.6 |
| 8,016,088 | B2 | * | 9/2011 | Morita ........................ 188/282.6 |
| 2008/0314704 | A1 | | 12/2008 | Deferme |
| 2010/0294604 | A1 | | 11/2010 | Morita |
| 2013/0105261 | A1 | * | 5/2013 | Murata ..................... 188/322.14 |

FOREIGN PATENT DOCUMENTS

| | | |
|---|---|---|
| CN | 101893054 A | 11/2010 |
| GB | 2228059 A | 8/1990 |
| JP | 61-164836 U | 10/1986 |

(Continued)

*Primary Examiner* — Pamela Rodriguez
(74) *Attorney, Agent, or Firm* — Rabin & Berdo, P.C.

(57) ABSTRACT

A valve structure includes a valve disc partitioning an interior of a damper into a one-side chamber and an other-side chamber, a plurality of one-side ports and a plurality of other-side ports communicating between the one-side chamber and the other-side chamber, a one-side leaf valve opening and closing only the one-side ports, and an other-side leaf valve opening and closing only the other-side ports, the one-side ports and the other-side ports are alternately arranged in the valve disc along the circumferential direction, and a plurality of through holes formed in the valve disk is opened from the inner circumferential side of openings of all the other-side ports and communicates with the one-side ports.

11 Claims, 8 Drawing Sheets

(56) References Cited

FOREIGN PATENT DOCUMENTS

| JP | 092154/1990 | 7/1990 |
| JP | H02-92154 U | 7/1990 |
| JP | H09-144799 A | 6/1997 |
| JP | 2005-076856 A | 3/2005 |
| JP | 2006-194335 A | 7/2006 |
| JP | 2010-270815 A | 12/2010 |

* cited by examiner

RELATED ART

VALVE STRUCTURE

TECHNICAL FIELD

The present invention relates to improvement of a valve structure.

BACKGROUND ART

A valve structure is applied, for example, to a piston portion of a damper for a vehicle, and the like.

As shown in FIG. 10, JP2006-194335A discloses a valve structure including a piston P slidably inserted into a cylinder C of a damper and partitioning an interior of the cylinder C into an extension side chamber ER and a pressure side chamber CR, pluralities of extension side ports EP and pressure side ports CP provided in the piston P and communicating between the extension side chamber ER and the pressure side chamber CR, an annular extension side leaf valve EL laminated in a pressure side chamber end of the piston P and opening and closing only the extension side ports EP, and an annular pressure side leaf valve CL laminated in an extension side chamber end of the piston P and opening and closing only the pressure side ports CP, wherein the extension side ports EP and the pressure side ports CP are alternately arranged along the circumferential direction of the piston P.

SUMMARY OF INVENTION

In a damper to which the above conventional valve structure is applied, at the time of a contraction operation of moving the piston P downward, as shown in FIG. 11, working oil of the compressed pressure side chamber CR is moved to the enlarged extension side chamber ER via the pressure side ports CP. At this time, the working oil pushes and warps the pressure side leaf valve CL. When the pressure side leaf valve CL is largely warped, a gap is formed between the pressure side leaf valve CL and the piston P on the inner circumferential side of the pressure side ports CP.

Then, contaminants Co such as iron powder and dust mixed into the working oil may sometimes come into this gap. In this state, when warp of the pressure side leaf valve CL is eliminated by a restoring force at the time of an extension operation of the damper of moving the piston P upward, the contaminants Co are nipped between the pressure side leaf valve CL and the piston P, so that there is a possibility that the pressure side ports CP cannot be completely closed.

Thereby, an outer circumference of the pressure side leaf valve CL is floated up from the piston P by the contaminants Co. Thus, the working oil in the compressed extension side chamber ER passes through not only the extension side ports EP but also the pressure side ports CP and is moved to the pressure side chamber CR.

Therefore, at the time of the extension operation of the damper, by a flow of the working oil passing through the pressure side ports CP, the outer circumference of the pressure side leaf valve CL floated up from the piston P is vibrated, so that a large noise is generated.

Some members forming the damper require cutting processing, and iron powder generated at the time of the cutting processing may sometimes remain attached to such members. Dust may sometimes remain attached to parts. Therefore, mixture of the contaminants Co is not easily completely prevented.

JP2005-76856A discloses that a bag shape or pocket shape foreign substance reservoir for collecting the contaminants Co is provided in a piston or a valve case installed in an end of a cylinder. However, since the working oil cannot flow into this foreign substance reservoir, the contaminants Co are not easily collected.

An object of the present invention is to provide a valve structure capable of preventing generation of a noise.

According to one aspect of the present invention, a valve structure comprises a valve disc partitioning an interior of a damper into a one-side chamber and an other-side chamber; a plurality of one-side ports provided in the valve disc and communicating between the one-side chamber and the other-side chamber; a plurality of other-side ports provided in the valve disc and communicating between the one-side chamber and the other-side chamber; an annular one-side leaf valve laminated in an other-side chamber end of the valve disc and opening and closing only the one-side ports; and an annular other-side leaf valve laminated in a one-side chamber end of the valve disc and opening and closing only the other-side ports, wherein the one-side ports and the other-side ports are alternately arranged in the valve disc along the circumferential direction, and a plurality of through holes formed in the valve disk is opened from the inner circumferential side of openings of all the other-side ports in the one-side chamber end of the valve disc and communicates with the one-side ports.

Embodiments of the present invention and advantages thereof are described in detail below with reference to the accompanying drawings.

DESCRIPTION OF EMBODIMENTS

Figure 1:
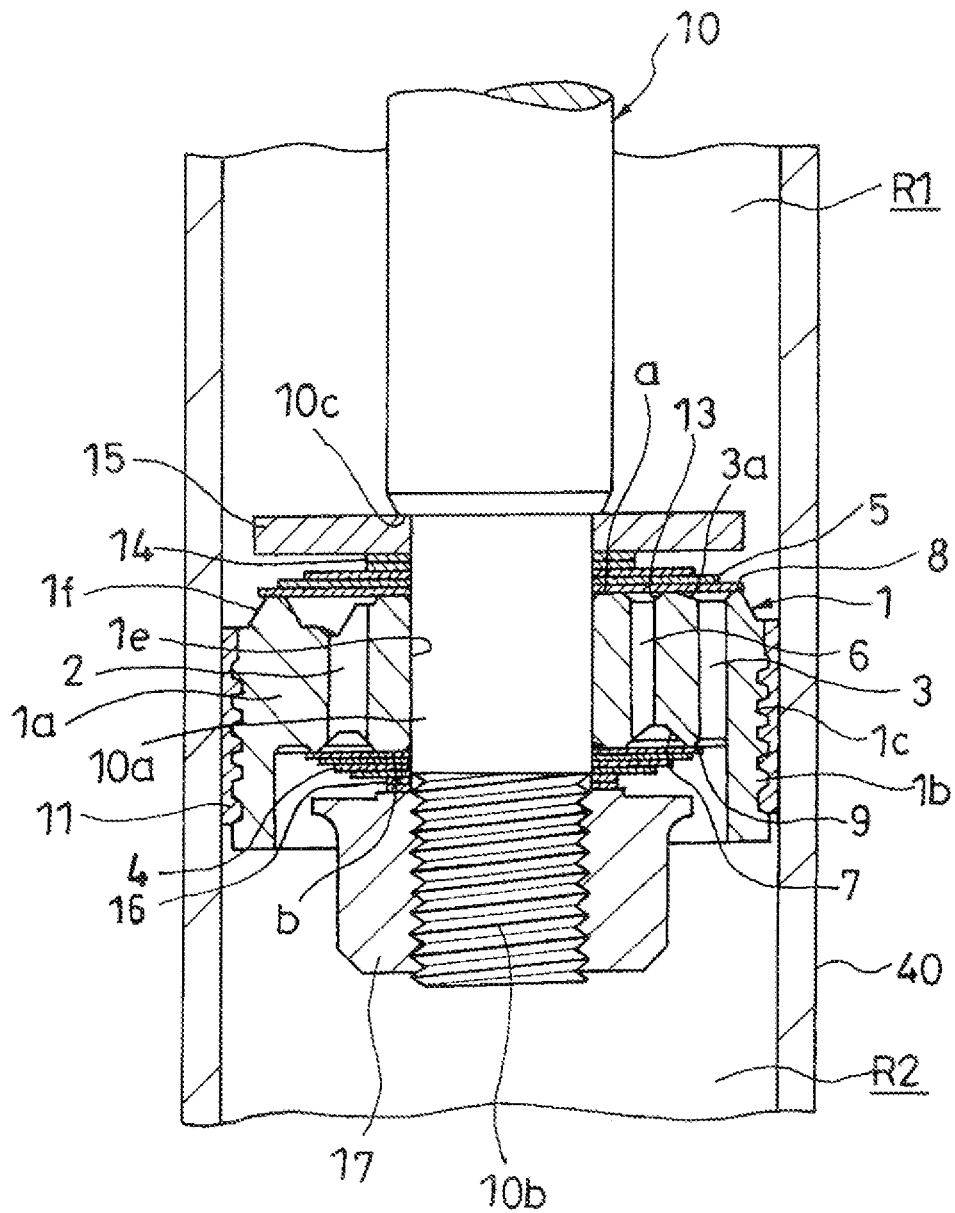
FIG. 1 is a vertically sectional view showing a piston portion of a damper to which a valve structure according to an embodiment of the present invention is applied.

Hereinafter, a valve structure of a damper in the present embodiment will be described based on the drawings.

As shown in FIGS. 1 to 4, the valve structure in the present embodiment is applied to a piston portion of the damper. The valve structure includes a piston 1 (valve disc) partitioning an interior of the damper into an extension side chamber R1 (one-side chamber) and a pressure side chamber R2 (other-side chamber), a plurality of extension side ports 2 (one-side ports) provided in the piston 1 and communicating between the extension side chamber R1 and the pressure side chamber R2, a plurality of pressure side ports 3 (other-side ports) provided in the piston 1 and communicating between the extension side chamber R1 and the pressure side chamber R2, an annular extension side leaf valve 4 (one-side leaf valve)

laminated in a pressure side chamber end b (other-side chamber end) of the piston 1 and opening and closing only the extension side ports 2, and an annular pressure side leaf valve 5 (other-side leaf valve) laminated in an extension side chamber end a (one-side chamber end) of the piston 1 and opening and closing only the pressure side ports 3, and a plurality of through holes 6 opened from the inner circumferential side of openings of all the pressure side ports 3 in the extension side chamber end a of the piston 1 and communicating with the extension side ports 2.

It should be noted that the extension side chamber R1 is a chamber to be compressed at the time of an extension operation of the damper, and the pressure side chamber R2 is a chamber to be compressed at the time of a contraction operation of the damper. A sectional view of the piston 1 of FIG. 1 is a sectional view by arrow A-A of the piston 1 shown in FIG. 2.

The damper includes, for example, a cylinder 40, a head member (not shown) sealing an upper end of the cylinder 40, a piston rod 10 slidably passing through the head member, the above piston 1 provided in an end of the piston rod 10, the extension side chamber R1 and the pressure side chamber R2 serving as two pressure chambers formed by partitioning an interior of the cylinder 40 by the piston 1, a sealing member (not shown) sealing a lower end of the cylinder 40, and a reservoir or an air chamber (not shown) compensating a volume change in the cylinder corresponding to a volume of the piston rod 10 projecting and retracting from the cylinder 40. A fluid, specifically working oil is charged into the cylinder 40. The damper may be not a single rod type but a double rod type.

In the above valve structure, in a case where the piston 1 is moved upward (in FIG. 1) with respect to the cylinder 40, a pressure in the extension side chamber R1 is increased, the working oil is moved from the extension side chamber R1 to the pressure side chamber R2 via the extension side ports 2, and the extension side leaf valve 4 applies resistance to this movement of the working oil. On the other hand, in a case where the piston 1 is moved downward (in FIG. 1) with respect to the cylinder 40, a pressure in the pressure side chamber R2 is increased, the working oil is moved from the pressure side chamber R2 to the extension side chamber R1 via the pressure side ports 3, and the pressure side leaf valve 5 applies resistance to this movement of the working oil.

Hereinafter, a detail of this valve structure will be described.

As shown in FIGS. 1 to 4, the piston 1 is formed in an annular shape and assembled to the piston rod 10 by inserting a small diameter portion 10a formed in a leading end of the piston rod 10 into the inner side of the piston 1. An outer circumference of the piston 1 is in sliding contact with an inner circumference of the cylinder 40. Thereby, the piston 1 partitions the interior of the cylinder 40 into the extension side chamber R1 and the pressure side chamber R2.

The piston 1 is formed in a bottomed tubular shape, and an insertion hole 1e into which the piston rod 10 is inserted, the four extension side ports 2, and the four pressure side ports 3 are provided in a bottom portion 1a. The extension side ports 2 and the pressure side ports 3 respectively pass through the bottom portion 1a in the piston 1 in the up and down direction as the axial direction, so as to communicate between the extension side chamber R1 and the pressure side chamber R2. The extension side ports 2 are arranged at equal intervals along the circumferential direction in the bottom portion 1a of the piston 1, and the pressure side ports 3 are also arranged at equal intervals along the circumferential direction in the bottom portion 1a of the piston 1. That is, the extension side ports 2 and the pressure side ports 3 are alternately arranged along the circumferential direction of the piston 1.

In the extension side chamber end a of the bottom portion 1a of the piston 1, a valve seat 8 surrounding the four pressure side ports 3 respectively independently from each other is provided. The valve seat 8 protrudes from the bottom portion 1a toward the side of the extension side chamber, and includes an annular portion 8a surrounding a periphery of the insertion hole 1e, and four seat portions 8b provided continuously to the annular portion 8a and formed in a fan shape when seen in a plan view. Parts of the bottom portion 1a where no valve seat 8 is provided, that is, parts between the seat portion 8b and the seat portion 8b along the circumferential direction are recessed toward the side of the pressure side chamber, and the extension side ports 2 are opened in the parts.

Figure 5:
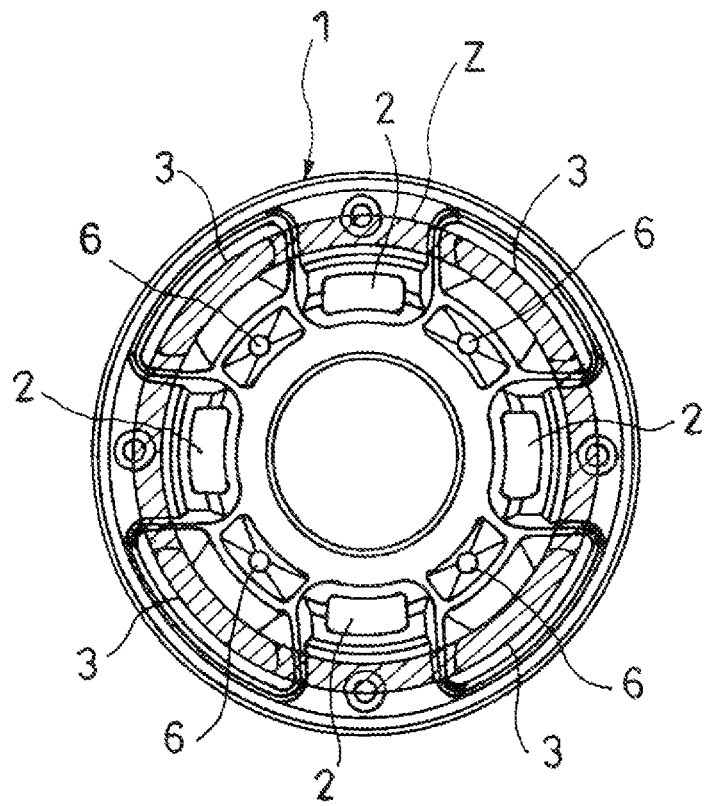
FIG. 5 is a view for illustrating arrangement of pressure side ports of the piston of FIG. 1.

In the bottom portion 1a, projections 1f are respectively provided between the seat portion 8b and the seat portion 8b along the circumferential direction. Independent windows 3a are respectively provided in extension side chamber ends of the pressure side ports 3, and the seat portions 8b of the valve seat 8 surround four sides of these independent windows 3a. As shown in FIG. 5, the extension side ports 2 are arranged on the inner circumferential side of a ring shape zone Z (part shown by diagonal lines in the figure) where the pressure side ports 3 are provided.

Figure 3:
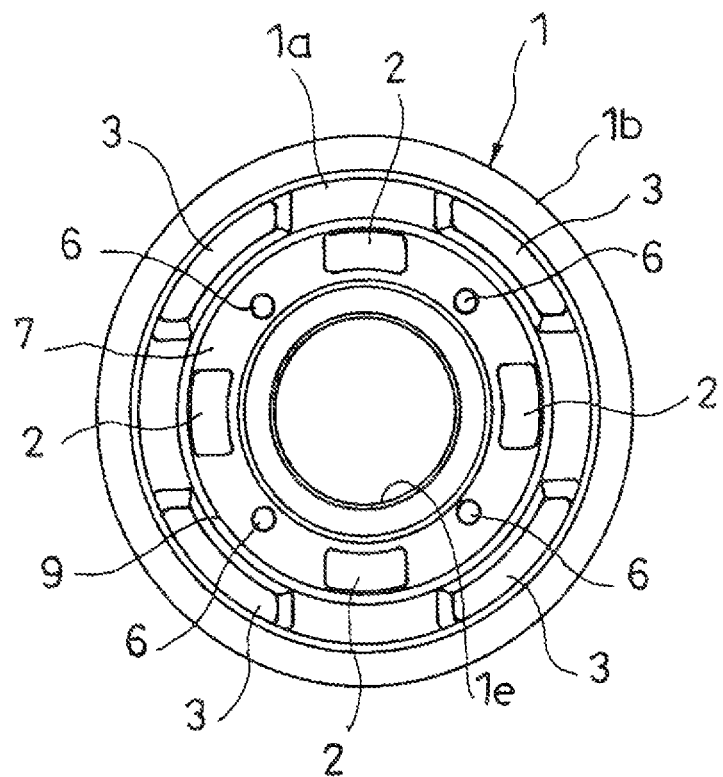
FIG. 3 is a bottom view of the piston of FIG. 1.

As shown in FIGS. 1 and 3, in the pressure side chamber end b of the bottom portion 1a of the piston 1, an annular window 7 communicating with all pressure side chamber ends of the four extension side ports 2 is provided. That is, the annular window 7 is formed in an annular recessed shape. An annular valve seat 9 is provided on the outer circumferential side of this annular window 7 and on the inner circumferential side of all the pressure side ports 3. The extension side ports 2 are arranged on the inner circumferential side of the ring shape zone where the pressure side ports 3 are provided. Thereby, the annular window 7 provided continuously to outlets of the extension side ports 2 can be surrounded by the annular valve seat 9. Thus, the pressure in the extension side chamber R1 can be uniformly applied over the entire circumference of the extension side leaf valve 4 to be described later.

Figure 2:
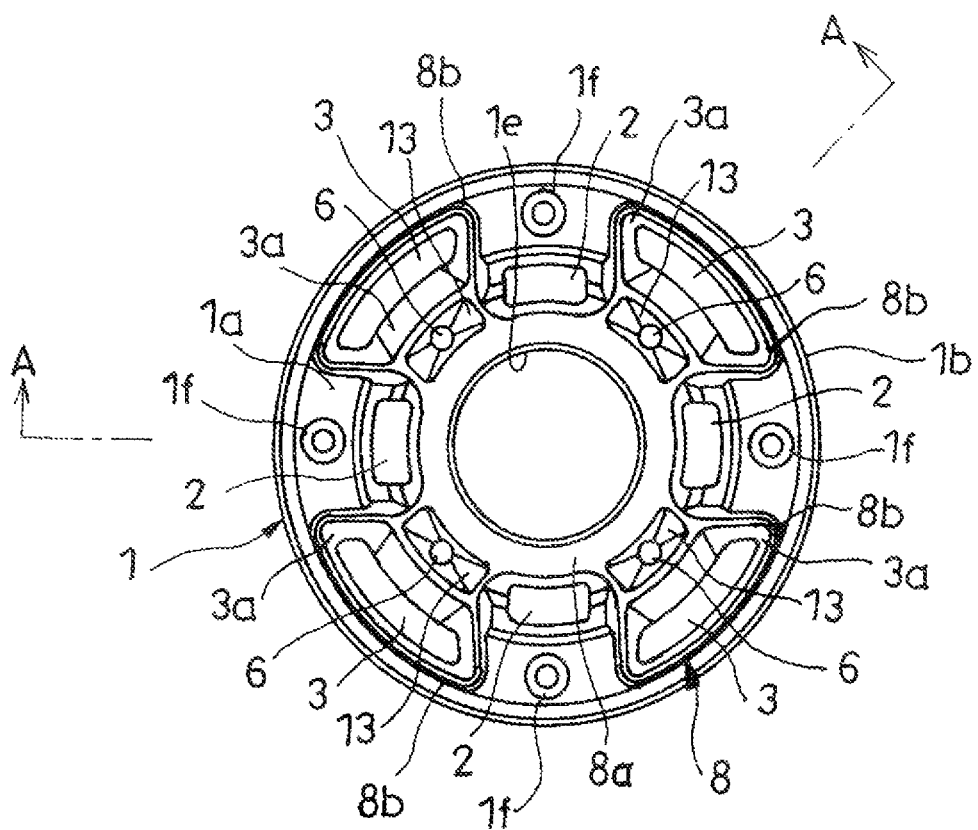
FIG. 2 is a plan view of the piston of FIG. 1.

As shown in FIGS. 1 and 2, in the extension side chamber end a of the bottom portion 1a of the piston 1, the four through holes 6 opened from the inner circumferential side of the independent windows 3a as ends of the pressure side ports 3 and leading to the extension side ports 2 are provided. The through holes 6 pass thorough the bottom portion 1a of the piston 1 along the up and down direction (in FIG. 1) as the axial direction, and pressure side chamber ends thereof lead to the annular window 7. The annular window 7 leads to the extension side ports 2 as described above.

Extension side chamber ends of the through holes 6 lead to dents 13 provided in the bottom portion 1a of the piston 1 and formed in a substantially rectangular shape in a plan view (FIG. 2). The dents 13 are formed in such a manner that depth is gradually increased toward a center of the rectangle, and the extension side ports 2 are opened in the deepest parts. The dents 13 are provided on the inner circumferential side of the independent windows 3a in the bottom portion 1a of the piston 1 so as to avoid contact with the independent windows 3a. Further, four sides of the dents 13 are surrounded by the seat portions 8b in the valve seat 8.

It should be noted that the installment number of the extension side ports 2 and the pressure side ports 3 is not limited to four described above. The number can be set to the arbitrary number, and as many through holes 6 as the installment number of the pressure side ports 3 may be provided. The through holes 6 may communicate with at least one of the plurality of extension side ports 2.

Figure 4:
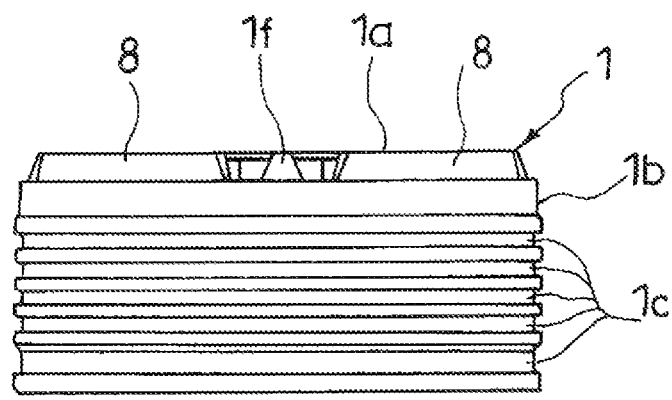
FIG. 4 is a front view of the piston of FIG. 1.
Figure 6:
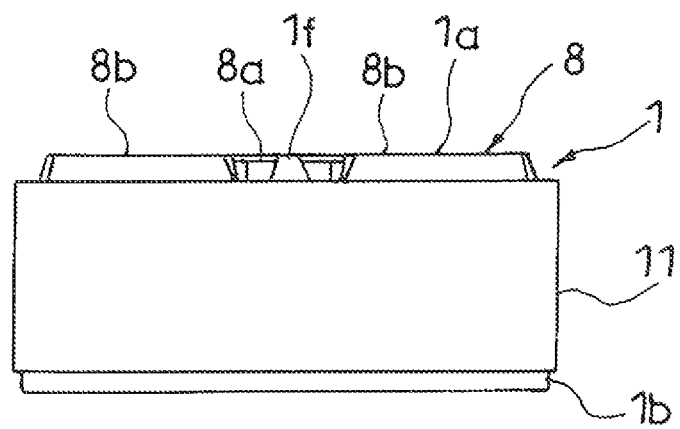
FIG. 6 is a front view showing a state that a piston ring is installed in the piston of FIG. 1.
Figure 7:
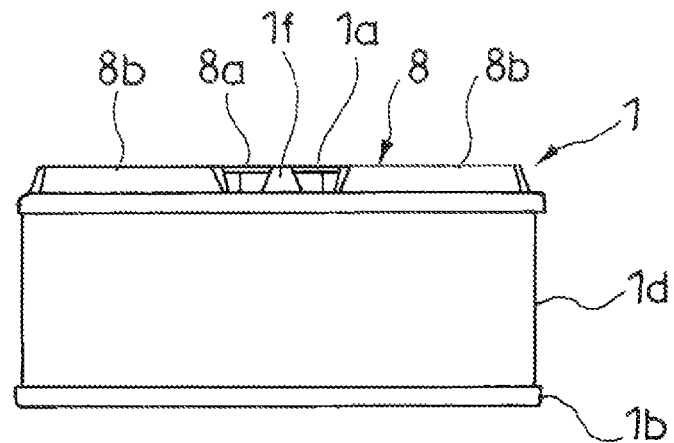
FIG. 7 is a front view of a piston showing a modified example of the piston of FIG. 1.
Figure 8:
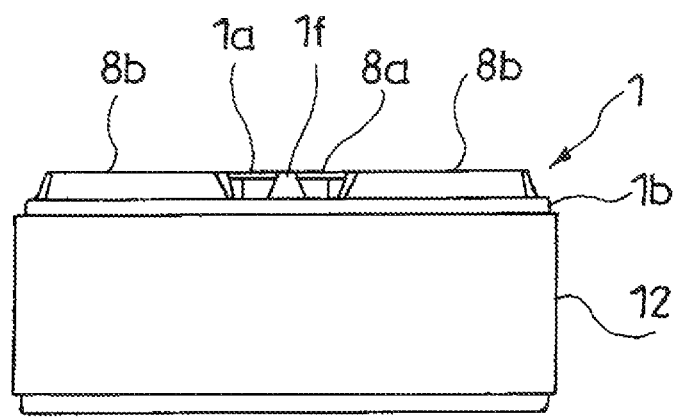
FIG. 8 is a front view showing a state that a piston ring is installed in the piston of FIG. 7.

As shown in FIG. 4, a plurality of annular grooves 1c is provided on an outer circumference of a tubular portion 1b of the piston 1. As shown in FIGS. 1, 4, 6, a synthetic resin piston ring 11 is installed on the outer circumference of the tubular portion 1b. The piston ring 11 is installed by heating and softening a disc shape synthetic resin base material while pressurizing and pushing into the outer circumference of the tubular portion 1b of the piston 1. It should be noted that instead, as shown in FIGS. 7 and 8, an annular recessed portion 1d may be provided in the tubular portion 1b, and an annular piston ring 12 having divisions in the annular recessed portion 1d may be installed. Although FIGS. 4, 6, 7, 8 show front views of the piston 1, a back view, a left side view, and a right side view are the same as the front view.

The piston 1 formed in such a way is assembled to the small diameter portion 10a of the piston rod 10. The piston rod 10 is arranged in such a manner that the small diameter portion 10a in the leading end faces the lower side (in FIG. 1) of the piston 1, and a threaded portion 10b is provided in a further leading end of the small diameter portion 10a. Since a part on the upper side (in FIG. 1) of the small diameter portion 10a has a larger diameter than the small diameter portion 10a, a stepped portion 10c is formed on a border between this small diameter portion 10a and the part on the upper side of the small diameter portion 10a.

In the extension side chamber end a as an upper end (in FIG. 1) of the piston 1, the annular pressure side leaf valve 5, an annular intermediate seat 14, and an annular valve stopper 15 are laminated in this order. In the pressure side chamber end b as a lower end (in FIG. 1) of the piston 1, the annular extension side leaf valve 4 and an annular intermediate seat 16 are laminated in this order. By a piston nut 17 screwed onto the threaded portion 10b which is provided in the small diameter portion 10a of the piston rod 10, in the order from the upper side in FIG. 1, the valve stopper 15, the intermediate seat 14, the pressure side leaf valve 5, the piston 1, the extension side leaf valve 4, and the intermediate seat 16 are fixed to the small diameter portion 10a of the piston rod 10. That is, the valve stopper 15, the intermediate seat 14, the pressure side leaf valve 5, the piston 1, the extension side leaf valve 4, and the intermediate seat 16 are held by the piston nut 17 and the stepped portion 10c of the piston rod 10 and fixed to the piston rod 10.

The extension side leaf valve 4 is formed by laminating a plurality of annular plates, and the inner circumferential side is fixed to the piston rod 10, so that warp of an outer circumference is allowed. In a case where no load is applied to the extension side leaf valve 4, the uppermost annular plate (in FIG. 1) in the extension side leaf valve 4 in contact with the bottom portion 1a of the piston 1 is seated on the annular valve seat 9 so as to close the extension side ports 2. At this time, an outer diameter of the extension side leaf valve 4 is set to such an extent that the pressure side ports 3 arranged on an outer circumference of the annular valve seat 9 are not closed. Thus, the extension side leaf valve 4 is not in contact with pressure side chamber ends of the pressure side ports 3. When the pressure of the extension side chamber R1 is applied to the extension side leaf valve 4 via the extension side ports 2, the extension side leaf valve 4 is pushed, warped, and separated from the annular valve seat 9, so that the extension side ports 2 are opened.

As well as the extension side leaf valve 4, the pressure side leaf valve 5 is formed by laminating a plurality of annular plates, and the inner circumferential side is fixed to the piston rod 10, so that warp of an outer circumference is allowed. In a case where no load is applied to the pressure side leaf valve 5, the lowermost annular plate (in FIG. 1) in the pressure side leaf valve 5 in contact with the bottom portion 1a of the piston 1 is seated on the valve seat 8 so as to close the pressure side ports 3. At this time, the parts of the valve seat 8 between the adjacent seat portions 8b are recessed toward the center direction of the piston 1 and the extension side ports 2 are opened in the parts. Thus, the pressure side leaf valve 5 does not close the extension side ports 2 even when the pressure side leaf valve 5 close the pressure side ports 3. When the pressure of the pressure side chamber R2 is applied to the pressure side leaf valve 5 via the pressure side ports 3, the pressure side leaf valve 5 is pushed, warped, and separated from the seat portions 8b of the valve seat 8, so that the pressure side ports 3 are opened.

As described above, the parts in the bottom portion 1a of the piston 1 between the adjacent seat portions 8b of the valve seat 8 are recessed. Thus, when the pressure side leaf valve 5 receives the pressure of the extension side chamber R1, parts which are not supported by the seat portions 8b are warped in the direction in which the extension side ports 2 are closed. However, since the projections 1f protrude between the adjacent seat portions 8b and support the pressure leaf valve 5, a flow passage area of the extension side ports 2 is not limited.

It should be noted that the extension side leaf valve 4 and the pressure side leaf valve 5 are formed by laminating the pluralities of annular plates, and warp rigidity can be adjusted by the number of lamination of the annular plates. The number of lamination is arbitrarily set in accordance with a damping characteristic that the damper is required (characteristic of a damping force generated with respect to piston speed of the damper).

In the valve structure formed in such a way, at the time of the contraction operation of the damper of moving the piston 1 downward (in FIG. 1), when the pressure of the compressed pressure side chamber R2 is increased and the pressure of the pressure side chamber R2 is applied to the pressure side leaf valve 5 via the pressure side ports 3, the outer circumference of the pressure side leaf valve 5 is warped, so that the pressure side ports 3 are opened. Thereby, there is a possibility that contaminants caught in the working oil come into the inner circumferential side of the pressure side ports 3 between the pressure side leaf valve 5 and the valve seat 8 provided in the piston 1 by a flow of the working oil passing through the pressure side ports 3.

Figure 9:
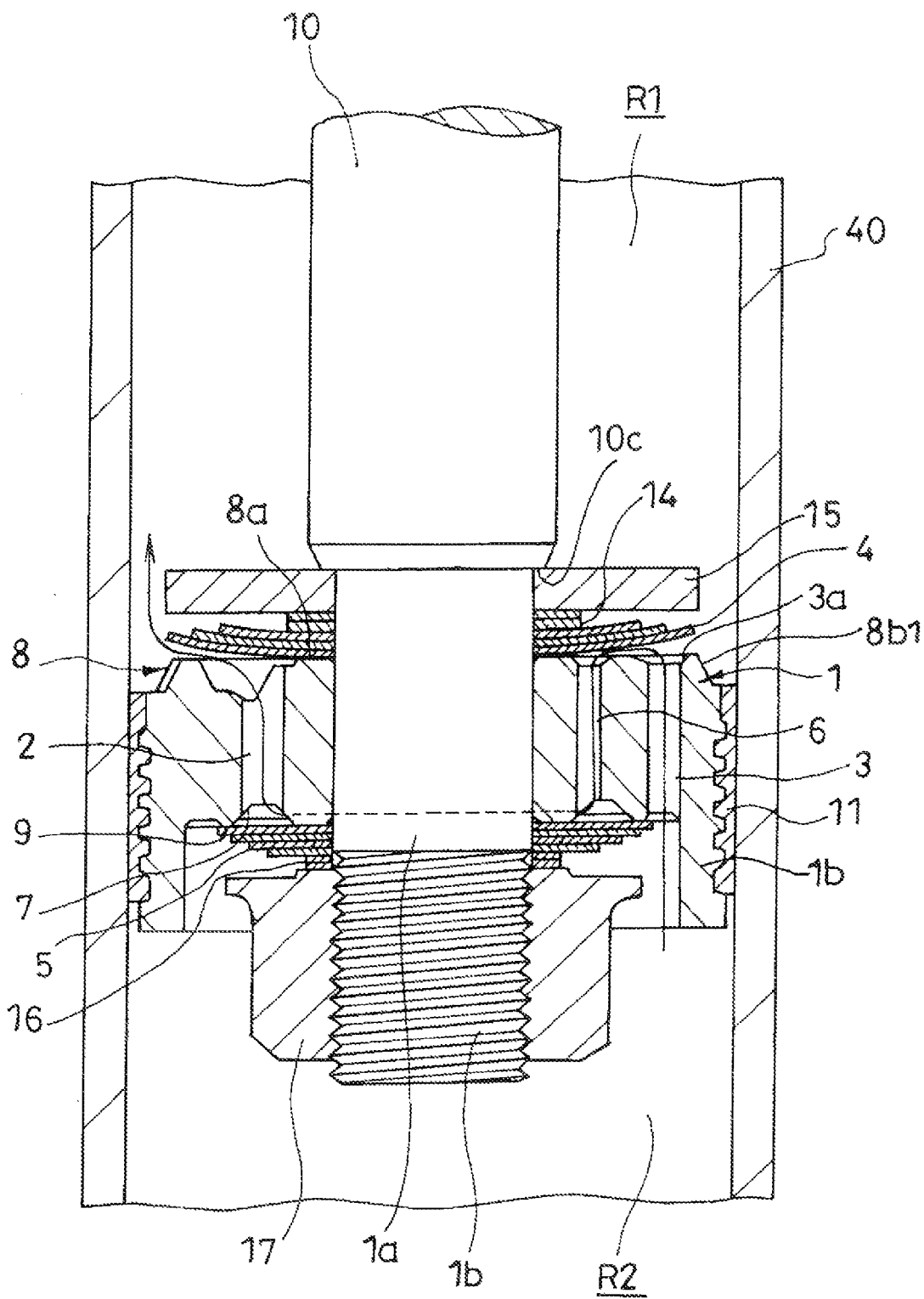
FIG. 9 is a view for illustrating a flow of working oil.
Figure 10:
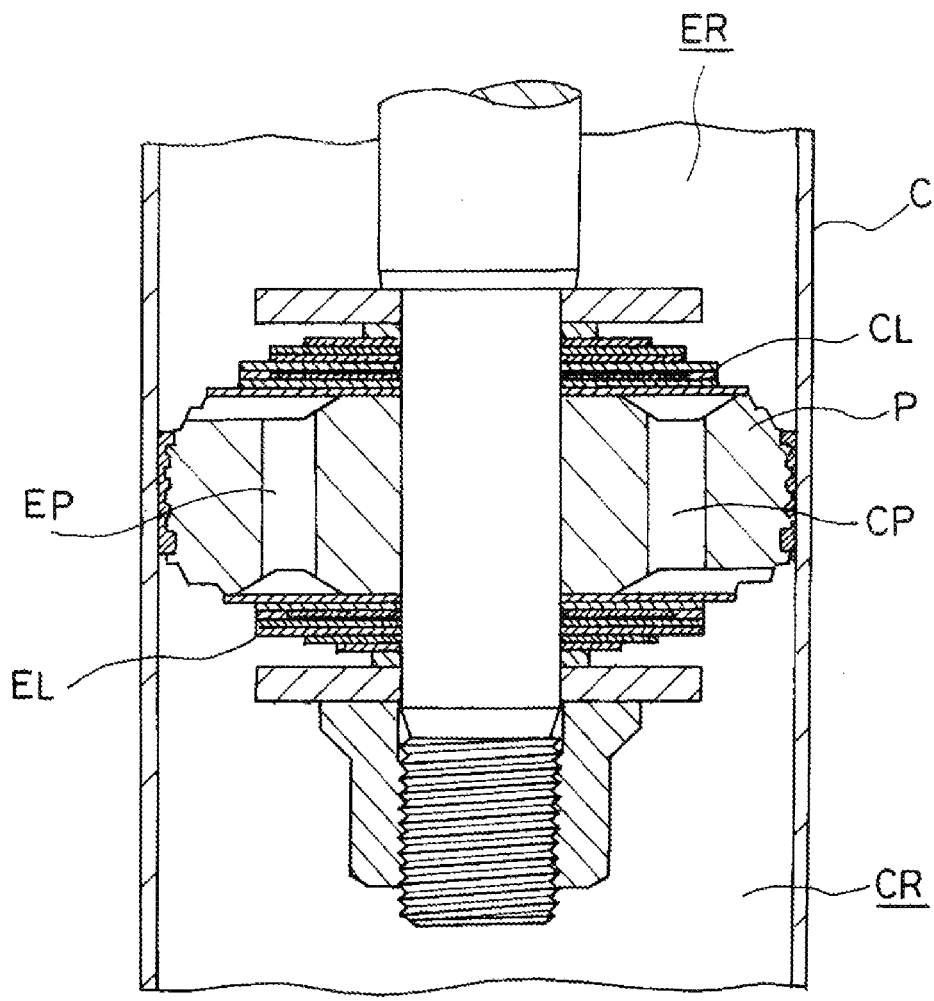
FIG. 10 is a vertically sectional view showing a piston portion of a damper to which a conventional valve structure is applied.
Figure 11:
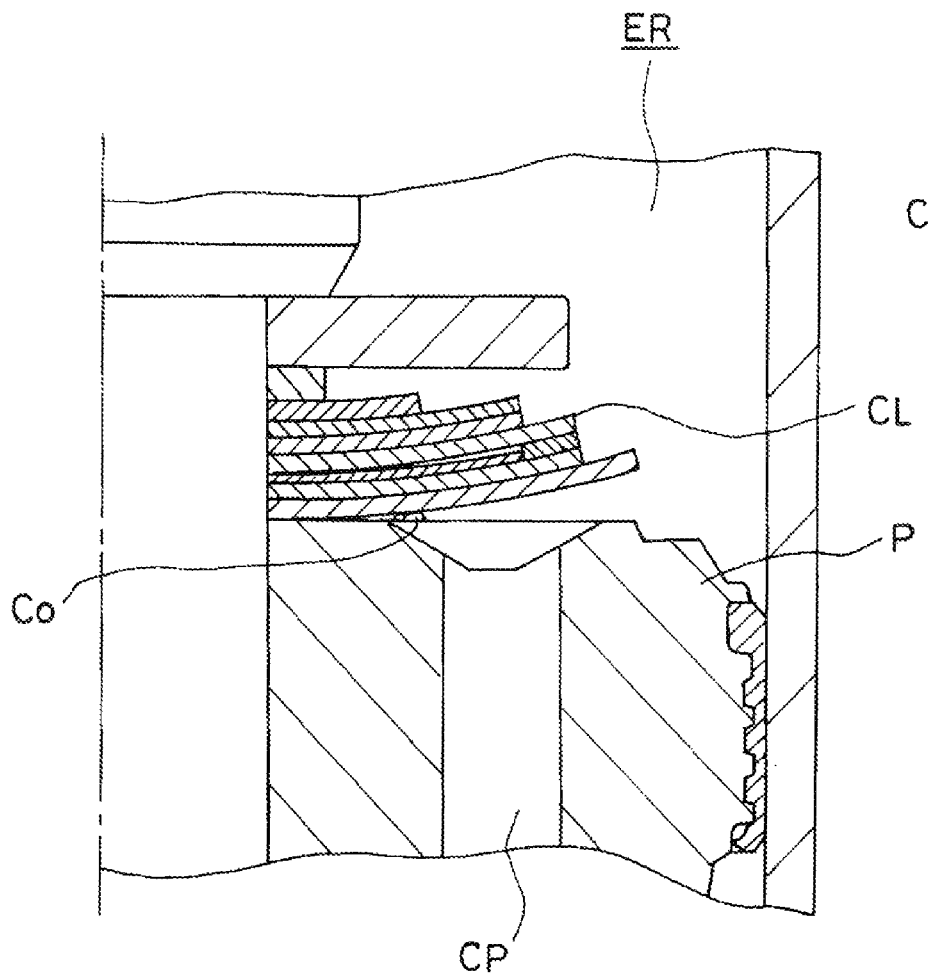
FIG. 11 is a view showing a state that a pressure side leaf valve in the piston portion of FIG. 10 is warped.

At this time, the inner circumferential side of the pressure side ports 3 leads to the extension side ports 2 via the through holes 6. The pressure side chamber ends in the extension side ports 2 are closed by the extension side leaf valve 4 pushed to the piston 1 by the pressure of the pressure side chamber R2, and opposite extension side chamber ends always lead to the extension side chamber R1. Therefore, as shown by an arrow of FIG. 9, a flow of the working oil passing from the pressure side ports 3 through to the through holes 6 and the extension side ports 2 and reaching to the extension side chamber R1 is generated. Thus, the contaminants do not remain in a gap between the pressure side leaf valve 5 and the valve seat 8 provided in the piston 1 but are discharged to the through holes 6 by the above flow of the working oil.

As described above, in the present embodiment, the contaminants can be prevented from being nipped between the pressure side leaf valve 5 and the piston 1 and the pressure side leaf valve 5 can be prevented from being floated up from the piston 1. Thus, when the operation direction of the damper is switched, generation of a large noise due to vibration of the outer circumference of the pressure leaf valve 5 can be prevented.

Since the contaminants can be prevented from being nipped between the pressure side leaf valve 5 and the piston 1, the pressure side leaf valve 5 can reliably close the pressure side ports 3. Thus, shortage of the damping force at the time of the extension operation of the damper can be prevented and the damping force can be stably obtained.

Further, the dents 13 are respectively provided on the inner circumferential side of the openings of all the pressure side ports 3 and the through holes 6 are opened in the dents 13. Thus, the contaminants coming into the gap between the pressure side leaf valve 5 and the valve seat 8 in the piston 1 can be promptly guided to the through holes 6. Even when the damper is switched from the contraction operation to the extension operation and the pressure side leaf valve 5 is seated on the valve seat 8 by a restoring force after being warped, the contaminants can be guided to the through holes 6 along the dents 13, so that the contaminants can be reliably prevented from being nipped between the pressure side leaf valve 5 and the piston 1. Further, the dents 13 are not in contact with the pressure side leaf valve 5. Thus, even when the pressure side leaf valve 5 is seated and the contaminants remain in the dents 13, the pressure side leaf valve 5 can be prevented from being floated up from the valve seat 8.

Further, the annular window 7 leading to the openings of all the extension side ports 2 is provided in the pressure side chamber end b of the piston 1 and the through holes 6 are arranged so as to communicate with the extension side ports 2 via the annular window 7. Thus, the through holes 6 can be formed along the axial direction with respect to the piston 1, drilling process for forming the through holes 6 becomes easier, and manufacturing cost of the piston to which the valve structure is applied can be reduced. It should be noted that the through holes 6 are not limited to the above structure but may be provided obliquely to the axial direction of the piston 1 or bent in the middle as long as the through holes are opened from the inner circumferential side of the pressure side ports 3 and lead to the extension side ports 2.

The embodiments of the present invention described above are merely illustration of some application examples of the present invention and not of the nature to limit the technical scope of the present invention to the specific constructions of the above embodiments.

For example, in the above embodiment, the description is given with the one-side chamber serving as the extension side chamber R1, the other-side chamber serving as the pressure side chamber R2, the one-side ports serving as the extension side ports 2, the other-side ports serving as the pressure side ports 3, the one-side leaf valve serving as the extension side leaf valve 4, and the other-side leaf valve serving as the pressure side leaf valve 5. However, instead, the one-side chamber may be the pressure side chamber R2, the other-side chamber may be the extension side chamber R1, the one-side ports may be the pressure side ports 3, the other-side ports may be the extension side ports 2, the one-side leaf valve may be the pressure side leaf valve 5, and the other-side leaf valve may be the extension side leaf valve 4. In this case, for example, a structure of the bottom portion 1a of the piston 1 becomes upside down in FIG. 1.

Further, a petal shape valve seat independently surrounding the pressure side ports 3 may be provided in the extension side chamber end a in the bottom portion 1a of the piston 1 and a petal shape valve seat independently surrounding the extension side ports 2 may be provided in the pressure side chamber end b in the bottom portion 1a of the piston 1. In this case, by providing through holes opened from the inner circumferential side of the pressure side ports 3 and leading to the extension side ports 2, and through holes opened from the inner circumferential side of the extension side ports 2 and leading to the pressure side ports 3, not only the pressure side leaf valve 5 but also the extension side leaf valve 4 can be prevented from being floated up.

Further, in the present embodiment, the case where the valve structure is applied to the piston portion of the damper is described. However, one of the one-side chamber and the other-side chamber can be a pressure side chamber of the damper, the other of the one-side chamber and the other-side chamber can be a reservoir for compensating volume of the damper, and the valve disc can be a valve case of a base valve attached to an end of the cylinder of the damper and partitioning the pressure side chamber and the reservoir.

Further, in the above embodiment, the dents 13 are respectively provided on the inner circumferential side of the openings of the pressure side ports 3 and the through holes 6 are opened in the dents 13. However, without providing the dents 13, the through holes 6 may be directly opened in the bottom portion 1a of the piston.

The present application claims a priority based on Japanese Patent Application No. 2011-127924 filed with the Japan Patent Office on Jun. 8, 2011, all the contents of which are hereby incorporated by reference.

INDUSTRIAL APPLICABILITY

The valve structure of the present invention can be utilized for a valve of a damper.

The invention claimed is:

1. A valve structure, comprising:
   a valve disc partitioning an interior of a damper into a one-side chamber and an other-side chamber;
   a plurality of one-side ports provided in the valve disc and communicating between the one-side chamber and the other-side chamber;
   a plurality of other-side ports provided in the valve disc and communicating between the one-side chamber and the other-side chamber;
   an annular one-side leaf valve laminated in an other-side chamber end of the valve disc and opening and closing only the one-side ports among the one-side ports and the other-side ports; and
   an annular other-side leaf valve laminated in a one-side chamber end of the valve disc and opening and closing only the other-side ports among the one-side ports and the other-side ports, wherein
   the one-side ports and the other-side ports are alternately arranged in the valve disc along the circumferential direction of the valve disc,
   a plurality of through holes formed in the valve disc is opened from the inner circumferential side of openings of all the other-side ports in the one-side chamber end of the valve disc and communicates with the one-side ports,
   the other-side leaf valve opens and closes the one-side chamber end of the through holes accompanying the opening and the closing of the other side ports.

2. The valve structure according to claim 1, wherein
   dents formed in the valve disc are respectively provided on the inner circumferential side of the openings of all the other-side ports in the one-side chamber end of the valve disc, and
   the through holes are opened in the dents.

3. The valve structure according to claim 1, comprising:
an annular window provided in the other-side chamber end of the valve disc and leading to openings on the side of the other-side chamber of all the one-side ports, wherein the through holes communicate with the one-side ports via the annular window.

4. The valve structure according to claim 1, wherein
the valve disc is a piston slidably inserted into a cylinder in the damper and partitioning an interior of the cylinder into an extension side chamber and a pressure side chamber, and
the one-side chamber is the extension side chamber, and the other-side chamber is the pressure side chamber.

5. The valve structure according to claim 1, wherein the one-side leaf valve and the other-side leaf valve are formed by laminating a plurality of annular plates.

6. The valve structure according to claim 1, wherein the one-side ports and the through holes are provided on a same circumference of the valve disc.

7. The valve structure according to claim 1, wherein independent windows, formed in the one-side chamber end of the valve disc, are provided on the openings of all the other-side ports, and
the through holes are opened to the radially inner circumferential side of the independent windows on the valve disc.

8. The valve structure according to claim 1, wherein independent windows, formed in the one-side chamber end of the valve disc, are provided on the openings of all the other-side ports, and
dents are opened to the radially inner circumferential side of the independent windows on the valve disc.

9. The valve structure according to claim 1, wherein the annular other-side leaf valve closes the other-side ports so as to block fluid communication between the other-side ports and the through holes.

10. A damper, comprising:
a damper body having an interior space;
a valve disc partitioning the interior space of the damper body into a one-side chamber and an other-side chamber;
a plurality of one-side ports provided in the valve disc and providing communication between the one-side chamber and the other-side chamber;
a plurality of other-side ports provided in the valve disc and providing further communication between the one-side chamber and the other-side chamber;
an annular one-side leaf valve disposed on a side of an other-side chamber end of the valve disc and opening and closing only the one-side ports among the one-side ports and the other-side ports;
an annular other-side leaf valve disposed on a side of a one-side chamber end of the valve disc and opening and closing only the other-side ports among the one-side ports and the other-side ports; and
a plurality of through holes formed in the valve disc to have one-side chamber end openings in the one-side chamber end of the valve disc at an inner circumferential side of openings of all the other-side ports, the through holes communicating with the one-side ports, wherein
the one-side ports and the other-side ports are alternately arranged in the valve disc along a circumferential direction of the valve disc, and
the other-side leaf valve opens and closes the one-side chamber end openings of the through holes accompanying the opening and the closing of the other-side ports.

11. The damper according to claim 10, wherein the annular other-side leaf valve closes the other-side ports so as to block fluid communication between the other-side ports and the through holes.

* * * * *